US 010095054B2

(12) United States Patent
Tada et al.

(10) Patent No.: US 10,095,054 B2
(45) Date of Patent: Oct. 9, 2018

(54) DISPLAY DEVICE

(71) Applicant: Japan Display Inc., Minato-ku (JP)

(72) Inventors: Yusuke Tada, Minato-ku (JP); Hajime Akimoto, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/628,942

(22) Filed: Jun. 21, 2017

(65) Prior Publication Data

US 2018/0004016 A1    Jan. 4, 2018

(30) Foreign Application Priority Data

Jun. 29, 2016  (JP) .................................. 2016-128984

(51) Int. Cl.
*G02F 1/1333* (2006.01)
*G02F 1/00* (2006.01)
(Continued)

(52) U.S. Cl.
CPC ...... *G02F 1/0009* (2013.01); *G02F 1/133707* (2013.01); *G02F 1/1523* (2013.01); *G02F 1/361* (2013.01)

(58) Field of Classification Search
CPC ............. G02F 1/1333; G02F 1/133345; G02F 1/1335; G02F 1/1343; G02F 1/134306; G02F 1/13454; G02F 1/0009; G02F 1/1362; G02F 1/136227; G02F 1/136286; G02F 1/1368; G02F 1/1523; G02F 1/161; G02F 1/361; G02F 1/133305; G02F 1/13338; G02F 2201/50; H01L 27/3276; H01L 27/3258; H01L 27/323; H01L 27/3246; H01L 27/3244; H01L 27/3262; H01L 27/3297; H01L 27/1218; H01L 27/124; H01L 27/3225; H01L 27/3248; H01L 51/5253; H01L 51/0097; H01L 51/5246; H01L 51/5237; H01L 51/524; H01L 51/5256; H01L 2251/5338; H01L 2224/32227; H01L 2224/73203; H01L 24/29; H01L 24/32; G06F 2203/04103; G06F 1/16; G06F 3/0416
(Continued)

(56) References Cited

U.S. PATENT DOCUMENTS

2017/0237025 A1* 8/2017 Choi .................... H01L 27/323
257/40

FOREIGN PATENT DOCUMENTS

JP         2015-75991        4/2015

* cited by examiner

*Primary Examiner* — Thoi Duong
(74) *Attorney, Agent, or Firm* — Oblon, McClelland, Maier & Neustadt, L.L.P.

(57) ABSTRACT

A display device includes: a first organic layer; display elements over the first organic layer in correspondence with the pixels; an inorganic layer sealing the display elements and the first organic layer; a second organic layer on a part of the inorganic layer; and a touch electrode on a surface of the inorganic layer and a surface of the second organic layer. The first organic layer has a rift in the peripheral area to surround the display area. The inorganic layer includes a concave part over the rift, and extends from the display area to the peripheral area continuously. The second organic layer is on the concave part of the inorganic layer. The surface of the second organic layer on which a touch electrode is put is contiguous to and is surrounded by the surface of the inorganic layer on the concave part.

6 Claims, 4 Drawing Sheets

(51) Int. Cl.
  *G02F 1/361* (2006.01)
  *G02F 1/1337* (2006.01)
  *G02F 1/15* (2006.01)

(58) Field of Classification Search
  USPC .............................. 349/139, 138, 12, 69, 43
  See application file for complete search history.

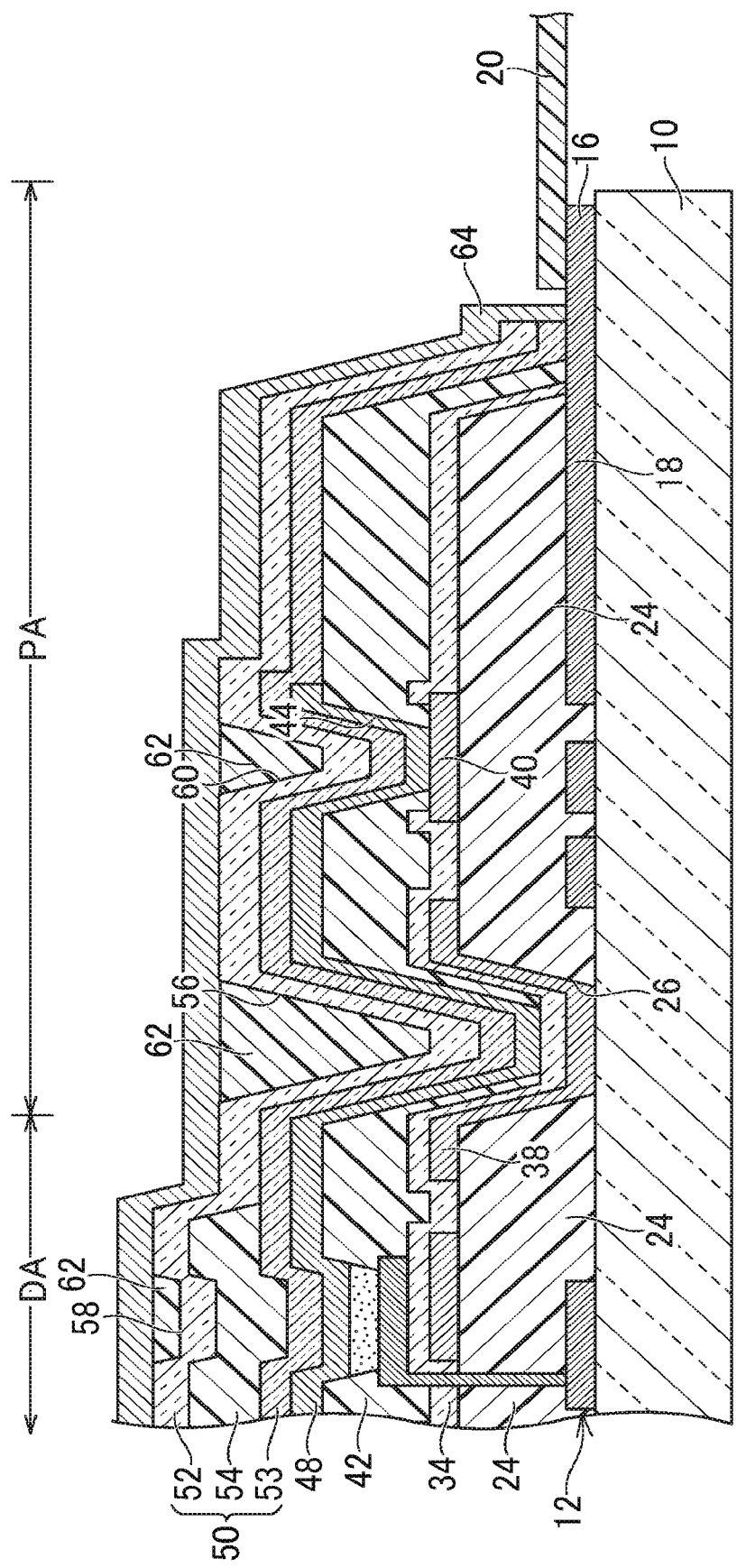

DISPLAY DEVICE

CROSS-REFERENCE TO RELATED APPLICATION

The present application claims priority from Japanese application JP2016-128984 filed on Jun. 29, 2016, the content of which is hereby incorporated by reference into this application.

BACKGROUND OF THE INVENTION

1. Field of the Invention

The present invention relates to a display device.

2. Description of the Related Art

As a touch panel of a mobile display such as a smartphone, the electrostatic capacitance type is widely adopted. Conventionally, in many cases, a touch panel is formed separately from a display. However, it has been a recent trend to incorporate its function into a display device for its superiority in a thickness, a cost and optical characteristics (Japanese Patent Application Laid-Open No. 2015-075991).

A display device includes a display element on a circuit layer including a thin film transistor. A surface of the circuit layer is uneven, and thus is not appropriate as a base of the display element without any treatment. Considering this, an organic layer is laminated on the circuit layer and the display element is formed on a smooth surface of the organic layer. In case of a display element that easily deteriorates due to moisture, such as an organic electroluminescence display element, an organic layer that tends to absorb moisture needs to be sealed by a sealing film made of an inorganic material. Therefore, a rift is formed in the organic layer so as to surround a display area on which the display element is provided. The sealing film is, at the rift of the organic layer, provided so as to range from the display area to a peripheral area around it so as to cover an edge of the organic layer.

In order to place the touch panel inside the display device, an electrode for touch sensing is provided on the sealing film, but as mentioned above, the sealing film to be a base of the electrode has the unevenness due to the rift of the organic layer. Therefore, if a photolithography is applied in a formation process of the electrode, since a height of a surface of a resist is uneven it is impossible to appropriately adjust a focal point of exposure, the resist is accumulated on a concave part to make the resist to be a thick film that makes the exposure insufficient, and in a convex part the resist is thinned and severed.

SUMMARY OF THE INVENTION

The object of the present invention is to incorporate a favorably formed touch sensing function into a display device.

A display device includes: a substrate that includes a display area on which a plurality of pixels are arranged in a matrix and a peripheral area that is around the display area; a circuit layer that is on the substrate so as to include a wiring in the display area and include a terminal for an electrical connection to an outside in the peripheral area; a first organic layer that is on the circuit layer in the display area and the peripheral area; a plurality of display elements that are over the first organic layer respectively in correspondence with the plurality of the pixels in the display area; an inorganic layer that seals the plurality of display elements and the first organic layer; a second organic layer that is on a part of the inorganic layer; and a touch electrode for touch sensing that is put on a surface of the inorganic layer and a surface of the second organic layer as a base respectively, wherein the first organic layer has a rift in the peripheral area so as to surround the display area, the inorganic layer includes a concave part over the rift, and extends from the display area to the peripheral area continuously, the second organic layer is on the concave part of the inorganic layer, and the surface of the second organic layer is contiguous to and is surrounded by the surface of the inorganic layer on the concave part.

According to the present invention, a second organic layer fills a concave part formed in an inorganic layer, and the unevenness of a base of a touch electrode for touch sensing can be moderated. Thus, a favorably formed touch sensing function can be incorporated into a display device.

BRIEF DESCRIPTION OF THE DRAWINGS

FIG. 4 illustrates a IV-IV line cross sectional view of the display device illustrated in FIG. 1.

DETAILED DESCRIPTION OF THE INVENTION

Figure 1:
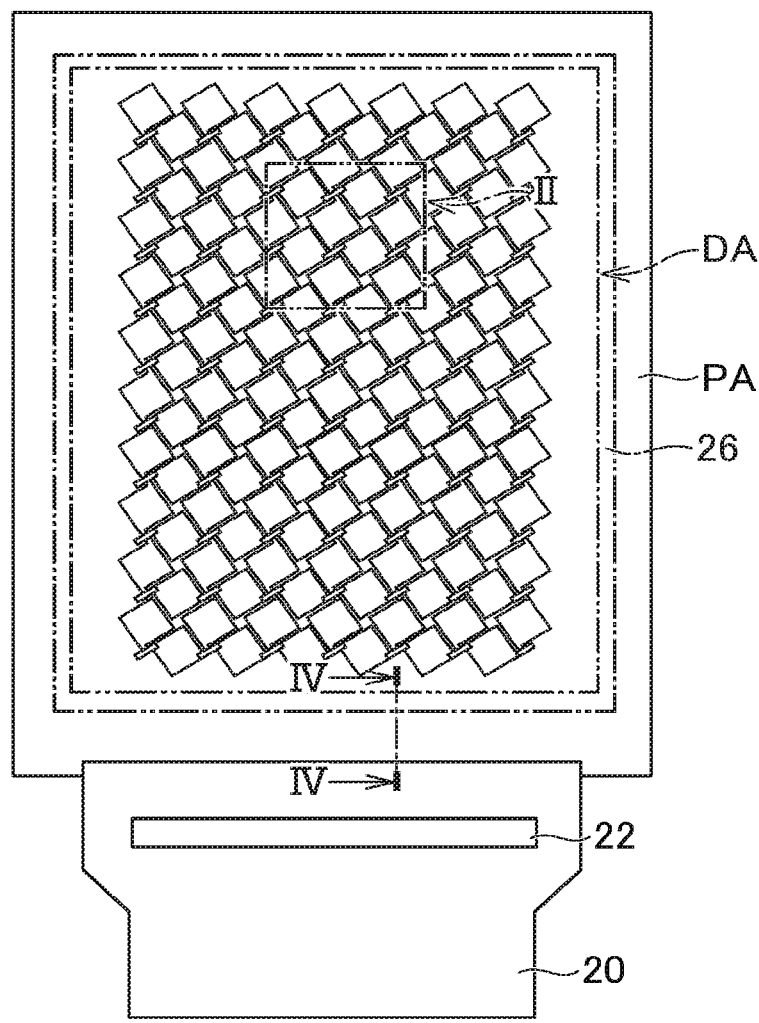
FIG. 1 illustrates a planar view of a display device according to an embodiment of the present invention.

Below, one or more embodiments of the present invention are illustrated with reference to the accompanying drawings. However, the present invention can be implemented in various modes without departing from the spirit thereof, and the interpretation should not be limited to the description of the one or more exemplary embodiments illustrated below.

While the width, thickness, shape, and the like of each component in the drawings may be illustrated schematically as compared with the actual modes in order to clarify the explanation, these are merely examples and the interpretation of the present invention should not be limited thereto. Furthermore, in the specification or the respective drawings, the same reference symbols may be applied to elements that have functions similar to those that have already been illustrated in another drawing and a redundant explanation of such elements may be omitted.

Further, in the detailed description of the invention, when a positional relationship between one component and another component is defined, unless specified otherwise, the words "on" and "under" are not applied only to a case where the other component is directly on or directly under the one component, but may also be applied to a case where still another component is interposed between the one component and the other component unless otherwise noted.

Figure 2:
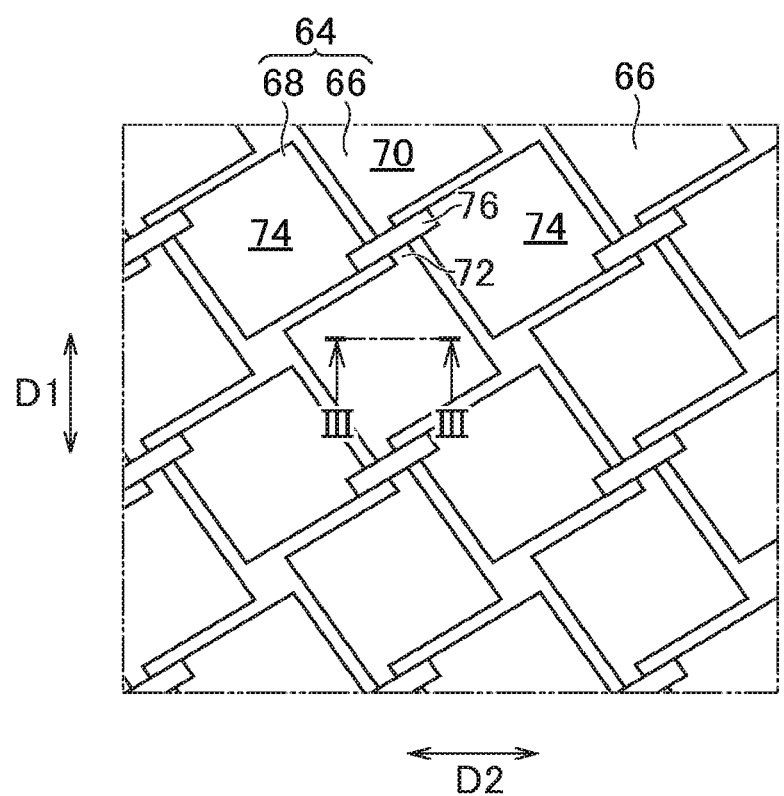
FIG. 2 illustrates a magnified view of a part specified by II of the display device illustrated in FIG. 1.
Figure 3:
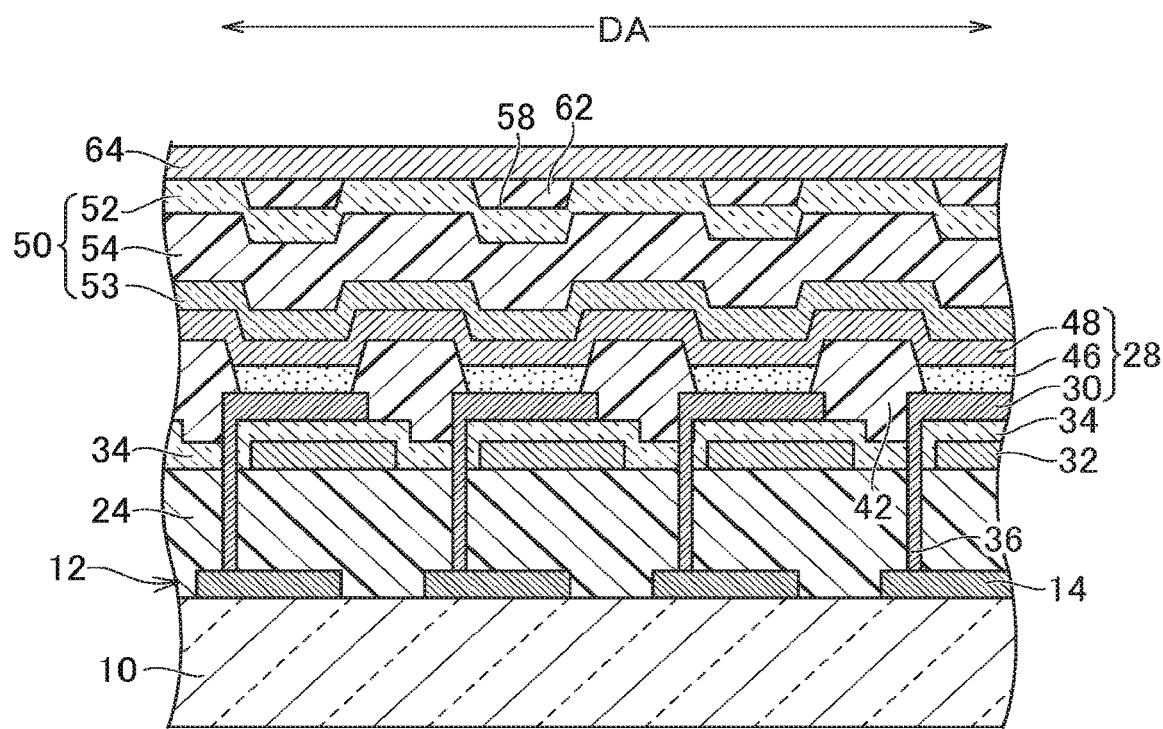
FIG. 3 illustrates a line III-III cross sectional view of the part illustrated in FIG. 2.

FIG. 1 illustrates a planer view of a display device according to an embodiment of the present invention. FIG. 2 illustrates a magnified view of a part specified by II of the display device illustrated in FIG. 1. FIG. 3 illustrates a III-III line cross sectional view of the part illustrated in FIG. 2. FIG. 4 illustrates a IV-IV line cross sectional view of the display device illustrated in FIG. 1.

As a display device, an organic electroluminescence display device is mentioned as an example. The display device is configured to display a full color image for example by combining a plurality of pixels (subpixels) constituted by red, green, and blue.

The display device includes a substrate 10 as illustrated in FIG. 3. The substrate 10 may be a glass substrate that has rigidity, and may also be a flexible film such as polyimide and polyethylene terephthalate. As illustrated in FIG. 1 the substrate 10 includes a display area DA. On the display area DA a plurality of pixels are arranged in a matrix, and an image constituted by the plurality of pixels is displayed. Around the display area DA there is a peripheral area PA that is frame shaped.

On the substrate 10 there is a circuit layer 12 as illustrated in FIG. 3. The circuit layer 12 includes, in the display area DA, a wiring 14 for the purpose of supplying an electric power and the like. The wiring 14 is electrically connected to one of a drain electrode and a source electrode of a thin film transistor (not illustrated). As illustrated in FIG. 4, the circuit layer 12 includes, in the peripheral area PA, a terminal 16 for an electrical connection to the outside. The terminal 16 is a part of another wiring 18. To the terminal 16 a flexible printed substrate 20 is connected electrically and mechanically. On the flexible printed substrate 20, as illustrated in FIG. 1, an integrated circuit chip 22 is mounted.

A display device includes a first organic layer 24 made of an organic material such as photosensitive acrylic resin. The first organic layer 24 is on the circuit layer 12 in the display area DA and the peripheral area PA. The first organic layer 24 has a first rift 26 in the peripheral area PA. The first rift 26 is, as illustrated in FIG. 1, frame shaped so as to surround the display area DA. With the existence of the first rift 26, the first organic layer 24 is disconnected between the inside and the outside of the first rift 26, and if the outside of the first rift 26 (the peripheral area PA) contains moisture, the moisture does not infiltrate into the inside of the first rift 26 (the display area DA). As to the wiring 18 that includes the terminal 16 as its part, the part that includes the terminal 16 is not covered by the first organic layer 24.

The display device includes a plurality of display elements 28. The plurality of display elements 28 are over the first organic layer 24 respectively in correspondence with the plurality of the pixels in the display area DA. The display element 28 includes a pixel electrode 30 (e.g., an anode). Specifically, a capacitance electrode 32 is provided on the first organic layer 24, an interlayer insulating film 34 (e.g., SiN) is formed on the capacitance electrode 32, and the pixel electrode 30 is provided on the interlayer insulating film 34. A capacitance to retain an image signal is formed by the pixel electrode 30 and the capacitance electrode 32 that sandwich the interlayer insulating film 34. The pixel electrode 30 is, via a contact part 36 that goes through the first organic layer 24, connected to the wiring 14 to which an electric power is supplied.

On the first organic layer 24, as illustrated in FIG. 4, a wiring 38 exists that extends from the display area DA to the peripheral area PA. This wiring 38 goes over the first rift 26 of the first organic layer 24, and is, in the first rift 26, positioned on the substrate 10 and covered by the interlayer insulating film 34. Further, on the first organic layer 24, in the peripheral area PA, there is a wiring 40 for electrically connecting an opposing electrode to be described later to the circuit layer 12 (e.g., a GND wiring).

As illustrated in FIG. 3, on respective peripheral parts of the plurality of pixel electrodes 30 an insulating layer 42 is put that is made for example of an organic material. The insulating layer 42 is configured to form an opening at a part (e.g., a central part) of the pixel electrode 30. A bank is formed that surrounds a part of the pixel electrode 30 by the insulating layer 42. As illustrated in FIG. 4, the insulating layer 42 is provided over the first organic layer 24 so as to avoid at least the bottom surface of the first rift 26 also in the peripheral area PA. There is a second rift 44 in the insulating layer 42 between the first rift 26 of the first organic layer 24 and the terminal 16. In the second rift 44 the wiring 40 (e.g., a GND wiring) is not fully covered by the insulating layer 42.

A light emitting layer 46 is provided on the pixel electrode 30. The light emitting layer 46 is provided for each one of the pixel electrodes 30 one by one (separately), and is on the insulating layer 42 also. In this case the light emitting layer 46 emits light in blue, red, or green in correspondence with the respective pixels. The colors that correspond to the respective pixels are not limited thereto, and can for example be yellow, white, and the like. Those layers are formed for example by a vapor deposition. Further, those layers may be formed all over the surface covering the display area DA, and may be formed over a plurality of pixels. That is, in FIG. 3, the light emitting layer 46 may be continuous over the insulating layer 42, and in that case, the light emitting layer 46 can be formed by an application by a solvent dispersion. In case of overall formation, it may be configured to have white light in all the subpixels and provide a color filter for extracting a desired part of color wavelengths.

The display element 28 includes the opposing electrode 48 (a common electrode or a cathode) laminated on the light emitting layer 46. The opposing electrode 48 is arranged over the insulating layer 42 to be the bank so that it is not short circuited to the pixel electrode 30. The light emitting layer 46 is sandwiched by the pixel electrode 30 and the opposing electrode 48, and emits light with its luminance controlled by a current that runs between them. Between the light emitting layer 46 and the pixel electrode 30, at least one of a hole injection layer and a hole transport layer (not illustrated) may be provided. Between the light emitting layer 46 and the opposing electrode 48, at least one of an electron injection layer and an electron transport layer (not illustrated) may be provided.

As illustrated in FIG. 4, the opposing electrode 48 goes over the first rift 26 and extends from the display area DA to the peripheral area PA. The opposing electrode 48 is, over the bottom surface of the first rift 26, put on the interlayer insulating film 34. In the peripheral area PA that is adjacent to the first rift 26, the opposing electrode 48 is put on the insulating layer 42. The opposing electrode 48 is, in the second rift 44, electrically connected to the circuit layer 12 via the wiring 40 (e.g., a GND wiring) on the first organic layer 24.

A sealing film 50 seals the plurality of display elements 28 and first organic layers 24. The light emitting element 46 is shut off from moisture by being covered by the sealing film 50 to be sealed. The topmost layer of the sealing film 50 is an inorganic layer 52. Between a pair of inorganic layers 52 and 53, an organic film 54 such as resin is sandwiched. The organic film 54 exists only in the display area DA, but the one pair of the inorganic layers 52 and 53 extends from the display area DA to the peripheral area PA continuously. In the peripheral area PA, the inorganic layers 52 and 53 of the pair contact with each other. The inorganic layer 52 includes, as illustrated in FIG. 4, a first concave part 56 over the first rift 26. Further, the inorganic layer 52 includes a second concave part 58 over a central part of each of the plurality of pixel electrodes 30, since there is the insulating layer 42 as illustrated in FIG. 3. Moreover, the inorganic layer 52 forms, as illustrated in FIG. 4, a third concave part 60 over the second rift 44 of the insulating layer 42 in the peripheral area PA.

There is a second organic layer 62 on a part of the inorganic layer 52. Specifically, as illustrated in FIG. 4, there is the second organic layer 62 on a first concave part 56 of the inorganic layer 52. The first concave part 56 is filled with the second organic layer 62. In accordance with the first rift 26 illustrated in FIG. 1, the first concave part 56 is frame shaped so as to surround the display area DA, and thus the surface of the second organic layer 62 is also frame shaped. The surface of the second organic layer 62 is contiguous to and is surrounded by the surface of inorganic layer 52, on the first concave part 56. The surface of the second organic layer 62 is flush with the surface of the inorganic layer 52.

As illustrated in FIG. 3, the second organic layer 62 is also on the second concave part 58 of the inorganic layer 52. The second concave part 58 is filled with the second organic layer 62. Since the second concave parts 58 are separately formed, the surfaces of the second organic layers 62 that correspond thereto are also formed separately. The surface of the second organic layer 62 is contiguous to and is surrounded by the surface of the inorganic layer 52 also on the second concave part 58. The surface of the second organic layer 62 on the second concave part 58 is flush with the surface of the inorganic layer 52.

As illustrated in FIG. 4, the second organic film 62 is also on the third concave part 60 of the inorganic layer 52. The third concave part 60 is filled with the second organic layer 62. The surface of the second organic layer 62 is contiguous to and is surrounded by the surface of the inorganic layer 52 also on the third concave part 60. The surface of the second organic layer 62 on the third concave part 60 is flush with the surface of the inorganic layer 52.

Here, the second organic layer 62 is arranged so as to planarize the unevenness due to the first concave part 56, the second concave part 58, and the third concave part 60. In the modes mentioned above, each of the surfaces of the second organic layers 62 is flush with the surface of the inorganic layer 52, but the actual modes are not limited to this as long as the second organic layer 62 is configured to moderate the unevenness. For example, the surface of the second organic layer 62 may be formed slightly recessed with respect to the surface of the inorganic layer 52.

The display device includes a touch electrode 64 to enable a touch sensing function. Taking an electrostatic capacitance touch sensor as an example, as illustrated in FIG. 2, a plurality of first touch electrodes 66 and a plurality of second touch electrodes 68 are used. Each of the plurality of first touch electrodes 66 extends in a first direction D1 (the vertical direction in FIG. 2), and neighboring first touch electrodes 66 extend in a second direction D2 (the horizontal direction in FIG. 2) with a space in between. The first touch electrode 66 is formed to have a part with a large width (a first electrode part 70) and a part with a small width (a first connection part 72) alternately. The second touch electrode 68 has a pair of second electrode parts 74 at the two lateral sides of the first touch electrode 66 so as to sandwich the first connection part 72 of the first touch electrode 66 in the second direction D2, and those are electrically connected by a second connection part 76. The second connection part 76 crosses the first connection part 72 three dimensionally, and those are insulated from each other by an unillustrated insulating material. Each of the plurality of second touch electrodes 68 extends in the second direction D2, and neighboring second touch electrodes 68 extend in the first direction D1 with a space in between. In this example, the first touch electrode 66 and the second touch electrode 68 are on the same layer, but as a variation, they may be arranged on different layers.

As illustrated in FIG. 4, the touch electrode 64 is electrically connected to the wiring 18 which includes the terminal 16 as its part. Specifically, in the peripheral area PA, the wiring 18 is not covered by the first organic layer 24 and the insulating layer 42 (and the inorganic layer 52 as well), and at this uncovered part the touch electrode 64 is connected to the wiring 18. Note that so as to cover the touch electrode 64 an unillustrated cover layer may be attached thereto with an intervention of an adhesive layer.

The base of the touch electrode 64 for touch sensing includes a surface of the inorganic layer 52 and the surface of the second organic layer 62. According to the present embodiment, the first concave part 56, the second concave part 58, and the third concave part 60 formed in the inorganic layer 52 are filled with the second organic layers 62, and therefore the unevenness of the base of the first touch electrode 66 and the second touch electrode 68 can be moderated. Thus, a favorably formed touch panel function can be incorporated into the display device.

Note that the display device is not limited to be an organic electroluminescence display device, and may be a display device that is provided with a light emitting element such as a quantum dot light emitting diode (QLED) at each pixel.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising:
    a substrate that includes a display area on which a plurality of pixels are arranged in a matrix and a peripheral area that is around the display area;
    a circuit layer that is on the substrate so as to include a wiring in the display area and include a terminal for an electrical connection to an outside in the peripheral area;
    a first organic layer that is on the circuit layer in the display area and the peripheral area;
    a plurality of display elements that are over the first organic layer respectively in correspondence with the plurality of the pixels in the display area;
    an inorganic layer that seals the plurality of display elements and the first organic layer;
    a second organic layer that is on a part of the inorganic layer; and
    a touch electrode for touch sensing that is put on a surface of the inorganic layer and a surface of the second organic layer as a base respectively,
    wherein the first organic layer has a rift in the peripheral area so as to surround the display area,
    the inorganic layer includes a concave part over the rift, and extends from the display area to the peripheral area continuously,
    the second organic layer is on the concave part of the inorganic layer, and
    the surface of the second organic layer is contiguous to and is surrounded by the surface of the inorganic layer on the concave part.

2. The display device according to claim 1,
    wherein the surface of the second organic layer is flush with the surface of the inorganic layer.

3. The display device according to claim 1,
wherein the plurality of display elements includes a plurality of pixel electrodes, a plurality of light emitting layers that are respectively laminated on the plurality of pixel electrodes, and an opposing electrode that is laminated on the plurality of light emitting layers,
the display device further including an insulating layer on respective peripheral parts of the plurality of pixel electrodes for preventing short circuiting of the plurality of pixel electrodes to the opposing electrode,
wherein the inorganic layer includes a second concave part over respective central parts of the plurality of pixel electrodes since there exists the insulating layer,
the second organic layer is also on the second concave part of the inorganic layer, and
the surface of the second organic layer is contiguous to and is surrounded by the surface of the inorganic layer also on the second concave part.

4. The display device according to claim 3,
wherein the surface of the second organic layer on the second concave part is flush with the surface of the inorganic layer.

5. The display device according to claim 3,
wherein the insulating layer is provided over the first organic layer also in the peripheral area so as to avoid the rift, the insulating layer having a second rift between the rift and the terminal,
the opposing electrode extends to the peripheral area and is electrically connected to the circuit layer at the second rift,
the inorganic layer forms a third concave part over the second rift,
the second organic layer is also on the third concave part of the inorganic layer, and
a surface of the second organic layer is contiguous to and is surrounded by the surface of the inorganic layer also on the third concave part.

6. The display device according to claim 5,
wherein the surface of the second organic layer on the third concave part is flush with the surface of the inorganic layer.

* * * * *